(12) United States Patent
Bariamis

(10) Patent No.: US 12,265,901 B2
(45) Date of Patent: Apr. 1, 2025

(54) METHOD FOR TRAINING AND OPERATING AN ARTIFICIAL NEURAL NETWORK CAPABLE OF MULTITASKING, ARTIFICIAL NEURAL NETWORK CAPABLE OF MULTITASKING, AND DEVICE

(71) Applicant: Robert Bosch GmbH, Stuttgart (DE)

(72) Inventor: Dimitrios Bariamis, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 941 days.

(21) Appl. No.: 17/419,940

(22) PCT Filed: Jan. 10, 2020

(86) PCT No.: PCT/EP2020/050511
§ 371 (c)(1),
(2) Date: Jun. 30, 2021

(87) PCT Pub. No.: WO2020/156780
PCT Pub. Date: Aug. 6, 2020

(65) Prior Publication Data
US 2022/0067482 A1      Mar. 3, 2022

(30) Foreign Application Priority Data

Jan. 30, 2019 (DE) .......................... 102019201188.8

(51) Int. Cl.
*G06N 3/00* (2023.01)
*G06N 3/04* (2023.01)

(52) U.S. Cl.
CPC ..................................... *G06N 3/04* (2013.01)

(58) Field of Classification Search
CPC ............. G06N 3/04; G06N 3/045; G06N 3/08
See application file for complete search history.

(56) References Cited

U.S. PATENT DOCUMENTS 11,232,344  B2 *  1/2022  Ravishankar .......... G06N 3/045
2017/0344881  A1 *  11/2017  Okuno ................. G06V 10/764
(Continued)

FOREIGN PATENT DOCUMENTS

CN        108292374 A      7/2018

OTHER PUBLICATIONS

International Search Report for PCT/EP2020/050511, Issued Apr. 14, 2020.

(Continued)

*Primary Examiner* — Barbara M Level
(74) *Attorney, Agent, or Firm* — NORTON ROSE FULBRIGHT US LLP; Gerard A. Messina

(57) ABSTRACT

A method for training an artificial neural network (ANN) capable of multitasking. A first path is provided for a first information flow through the ANN, the first path coupling an input layer with at least one task-spanning intermediate layer which is common to a plurality of differing tasks of the ANN. The first path couples the at least one task-specific intermediate layer with a respective task-specific ANN segment of the tasks. First training data are supplied via the input layer and the first path for training task-spanning parameters that are common to the tasks. At least one task-specific second path is provided for a second information flow through the ANN that differs from the first information flow. The second path couples the input layer with only a subset of the task-specific ANN segments of the tasks, and second training data are supplied for training task-specific parameters via the second path.

13 Claims, 3 Drawing Sheets

(56) References Cited

U.S. PATENT DOCUMENTS

| | | | | |
|---|---|---|---|---|
| 2018/0276533 A1* | 9/2018 | Ding | .................. | G06N 3/08 |
| 2019/0114528 A1* | 4/2019 | Xiong | .................. | G06N 3/08 |
| 2019/0130247 A1* | 5/2019 | Ravishankar | .................. | G06N 3/08 |
| 2019/0130257 A1* | 5/2019 | Meyerson | .................. | G06N 3/045 |
| 2020/0125955 A1* | 4/2020 | Klinger | .................. | G06N 3/047 |
| 2023/0176840 A1* | 6/2023 | Zhou | .................. | G06F 8/451 |
| | | | | 717/151 |

OTHER PUBLICATIONS

Liu et al., "Recurrent Neural Network for Text Classification With Multi-Task Learning," Cornell University Library, 2016, pp. 1-7.
Thung Kim-Han et al., "Multi-Stage Diagnosis of Alzheimer's Disease With Incomplete Multimodal Data via Multi-Task Deep Learning," International Conference on Financial Cryptography and Data Security; [Lecture Notes in Computer Science], Springer, 2017, pp. 160-168.

\* cited by examiner

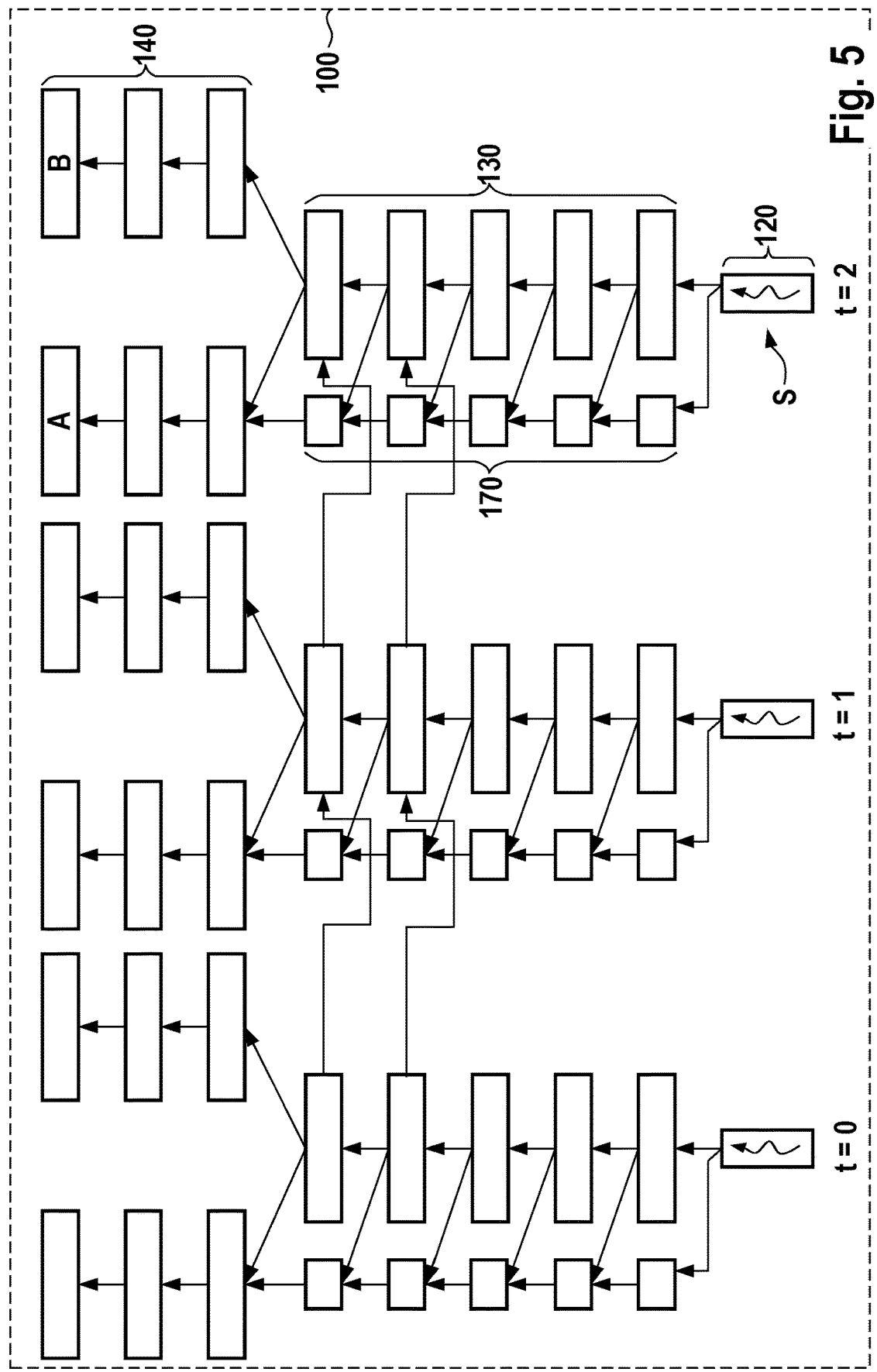

METHOD FOR TRAINING AND OPERATING AN ARTIFICIAL NEURAL NETWORK CAPABLE OF MULTITASKING, ARTIFICIAL NEURAL NETWORK CAPABLE OF MULTITASKING, AND DEVICE

In general, the present invention relates to the field of artificial intelligence and machine learning. More specifically, the present invention relates to a method for training an artificial neural network capable of multitasking, to an artificial neural network capable of multitasking, and to a device having such an artificial neural network. In addition, the present invention also relates to a computer program and to a memory medium.

BACKGROUND INFORMATION

Artificial neural networks, ANNs, are frequently used in the field of artificial intelligence and especially in the field of machine learning. The technical tasks such an ANN is capable of satisfying are numerous and extend to a multitude of technical fields such as, among others, automation technology, robotics, their subfields as well as image recognition, and similar areas.

In this context, it is also possible to use multitasking ANNs, which are designed to carry out a plurality, i.e., at least two different, tasks in parallel with one another, in particular simultaneously, concurrently, in alternation, etc., based on input data supplied to the ANN. In comparison with the operation of multiple parallel ANNs that are capable of (only) a single task and carry out only one specific task individually based on supplied input data in each case, multitasking ANNs are able to jointly utilize at least a portion of the functions inherent in the ANN, intermediate calculations and the like for multiple tasks. Compared to the use of multiple ANNs that are capable of only a single task, computational resources such as computation times, memory space, memory bandwidths, etc., may be saved. Already during the training of such a multitasking ANN, shared information can also be jointly used for training in order to achieve the best possible overall performance for the plurality of tasks to be satisfied. However, it has shown to be disadvantageous that a dependency between the different tasks may be created as a result of the shared use of functions, intermediate calculations, information or the like of the ANN, which makes task-specific adaptations of the multitasking ANN more difficult, for instance by requiring a (new) validation of all tasks. In an adaptation that should actually pertain only to a single task, for example, an undesired co-adaptation of some other task could occur in such a case with the result that a renewed validation will be necessary not only for the task actually to be adapted but also for the task not meant to be adapted.

SUMMARY

Example embodiments of the present invention provide an improved option for using an artificial neural network (ANN) capable of multitasking. Advantageous further improvements of the present invention result from the disclosure herein including the figures.

A first aspect of the present invention provides a method for training an artificial neural network, ANN, that is capable of multitasking. In accordance with an example embodiment of the present invention, the method has the following steps:

A first path is provided for a first information flow through the ANN. This first path couples an input layer of the ANN with at least one task-spanning intermediate layer (e.g., hidden layer) of the ANN; the at least one task-spanning intermediate layer may also be denoted as a task-spanning ANN segment. The intermediate layer is common to a plurality of, i.e., at least two, differing tasks of the ANN or is shared by or for these tasks so that it is also able to be made more specific from a hidden layer to a shared layer. In addition, the first path couples the at least one task-spanning intermediate layer with a respective task-specific ANN segment of the plurality of tasks differing from one another. The respective ANN segment thus is allocated to precisely a single task, it also being possible to provide multiple, in particular hierarchically configured, ANN segments for each task. The at least one ANN segment may be or may include a task-specific output layer of the ANN for carrying out a specific task. Accordingly, the task-specific output layer is able to generate or supply output data and/or an output signal.

First training data for training task-spanning parameters are supplied via the input layer and/or the first path. These task-spanning parameters are common to the plurality of differing tasks of the ANN, which therefore means that they are able to be shared, reused, etc., among the tasks, for instance. The task-spanning parameters, for example, may particularly be understood as weights, distortions, activation functions, etc. of the ANN.

In addition to the first path, at least one task-specific, second path is provided for a second information flow through the ANN that differs from the first information flow. The second path couples the input layer of the ANN with only a subset of the task-specific ANN segments of the plurality of differing tasks. In other words, the information flow brought about via the second path does not terminate in all of the different tasks but only in a subset of the tasks. By way of example, the second path in an ANN which is meant to carry out a total of two different tasks may allow an information flow to only a single task, whereas the other task is decoupled from the second path.

Second training data for training task-specific parameters are conveyed via the second path. Preferably, the second training data are at least task-specific, that is to say, are allocated to at least one of the plurality of different tasks.

This example method may improve the application of an ANN capable of multitasking in that only a single task or a subset of multiple specific tasks is separately modified and/or improved. In this context, a modification and/or an improvement particularly should be understood to denote that this single task or this subset of multiple specific tasks is able to be newly trained, adapted, corrected, finetuned, etc. However, the provided method ensures that the remaining tasks will not be affected by this, especially the task-specific parameters allocated thereto such as their weights, distortions, activation functions, etc. It is understood that this new training, adaptation, correction, finetuning, etc., is accomplished based on the second training data via the second path.

However, the provided method not only makes it possible to advantageously use desired commonalities or dependencies of the differing tasks in order to save computational resources through a shared utilization of functions, intermediate calculations, information and others, but also to achieve a certain decoupling of the different tasks for an individual adaptation of the various tasks. In the event that the ANN would need to be validated for its application, for instance in order to obtain a release in the live operation, e.g., in the field of automatization technology, robotics, etc., then the provided method is able to significantly reduce the related outlay insofar as essentially only the task coupled with the second path has to be validated by the second path because the other tasks have not changed (further) since the most recent validation.

An ANN particularly should be understood as a directed graph, whose nodes represent a number of neurons disposed in the afore-described layers, and whose edges represent connections between them. The parameters to be trained may influence especially the intensity of the information flow along these connections.

Accordingly, the first path may permit information along all nodes and/or edges, but the second path may permit information only along a subset of these nodes and/or edges. In this context, a task particularly should be understood as a task, possibly a self-contained task, for example represented by at least a portion of a computer program.

The different tasks are able to execute tasks in the field of automation technology, robotics, etc., such as for an at least partly automated, i.e., partly autonomous, robot. Exemplary applications for such an ANN are also to be found in the field of automotive technology, in particular for at least partly automated vehicles, for instance. Exemplary tasks could be a traffic sign detection, a semantic scene segmentation or something similar. For example, the ANN capable of multitasking can thus carry out a traffic sign detection as a first task and a semantic scene segmentation as a second, differing task. In addition, for instance, other applications in the field of automation technology in general and in the field of automotive technology, in particular, are possible.

According to a further development of the present invention, an information flow from the at least one task-spanning intermediate layer to the second path may be permitted, but an opposite information flow from the second path to the task-spanning intermediate layer is able to be prevented. In other words, the shared parameters, etc., may continue to be used for the task coupled with the second path, but they are unable to be modified by the second path, which means that they may remain unchanged for the rest of the tasks. The information flow of the second path is unidirectional with regard to the task-spanning intermediate layer. This allows for an adaptation of individual tasks that is particularly sparing of computational resources.

According to another further refinement of the present invention, the at least one task-specific ANN segment may have multiple layers by itself, i.e., have a correspondingly greater number of hierarchically situated, task-specific task (intermediate) layers (i.e., task-specific hidden layers as the case may be). It should be noted that a number of task-specific task layers of the one task may differ from the number of task-specific task layers of another task. In relation to a representation of the ANN in the form of a graph, the at least one task-specific ANN segment may thus have multiple task-specific nodes, which are connected to one another via corresponding task-specific edges only within the same task-specific ANN segment.

In a further development of the present invention, the respective task-specific ANN segment is able to be modified or adapted via the second path. In particular, a number of task-specific task layers etc. of this ANN segment is able to be modified. For instance, further task-specific task layers may be added to this task-specific ANN segment or existing task-specific layers be removed therefrom. In addition or as an alternative, for instance, a number of neurons of one or more task-specific layers of the task-specific ANN segment can be changed, that is to say, reduced or increased, for instance. This allows for a particularly good adaptation of individual tasks without changing the other tasks at the same time. According to a further refinement, the second training data, conveyed via the second path, may be combined from input data which are supplied to the input layer, and from intermediate layer data, which are derived from the at least one task-spanning intermediate layer. This allows for an adaptation of individual tasks that is particularly sparing of computational resources.

In a further refinement of the present invention, it is possible to select from a plurality of task-spanning intermediate layers the particular ones for a linkage with the second path that aid in the training of the task-spanning parameters. For example, only those of the multiplicity of especially hierarchically arranged, task-spanning intermediate layers are connected to the second path that are relevant, helpful, useful, etc., for the adaptation of the task coupled with the second path. In this way, the task-specific quality of the ANN is able to be further improved.

According to a further refinement of the present invention, a validation of at least a portion of the tasks able to be carried out by the ANN may be performed between the supply of the first training data and the supply of the second training data. The supply of the second training data for the adaptation of at least one specific task can be carried out while excluding an adaptation of at least one further specific task that differs therefrom. Since the further specific task has already been validated following the supply of the training data and possibly following a test operation and has not undergone any further change by the supply of the second training data because of the decoupling from the second path, it is possible to dispense with an additional validation of the other specific tasks. The ANN is therefore adaptable at a low validation expense.

A second aspect of the present invention provides an artificial neural network, ANN, which is capable of multitasking. As described above, the ANN particularly may be understood as a directed graph whose nodes represent a number of neurons disposed in the afore-described layers and whose edges represent interposed connections. The provided ANN has an input layer, a plurality of task-specific ANN segments, i.e., the number corresponding to the number of tasks that are allocated to a plurality of differing tasks of the ANN, and at least one task-spanning intermediate layer, which is situated between the input layer and the plurality of task-specific ANN segments and includes a number of parameters that are usable in a task-spanning manner.

In addition, the provided ANN has a first path, which couples the input layer via the at least one task-spanning intermediate layer with the plurality of task-specific ANN segments for a first information flow through the ANN.

Moreover, the provided ANN has at least one task-specific second path, which couples the input layer with only a subset of the plurality of task-specific ANN segments for a task-specific second information flow through the ANN that differs from the first information flow.

This ANN allows for a computationally resource-sparing adaptation of one or more specific task(s) of the ANN. In an advantageous manner, parameters such as weights, distortions, activation functions, etc. that are common to all (or at least multiple) tasks are first able to be trained via the first path. However, if it should turn out during a validation or during a live operation of the ANN that a specific task or its execution has to be changed in some way, then this may be accomplished without any effect on the other specific tasks. This makes it possible to combine advantages of a multitasking ANN with regard to a shared utilization of certain components of the ANN with advantages of a simple adaptation of specific tasks similar to an ANN capable of a single task.

According to a further development of the present invention, the number of layers of the second path may differ from the number of the task-spanning intermediate layers. In other words, the second path may have a number of nodes and/or edges that deviates from the first path, in particular with regard to the task-spanning intermediate layers. It is possible for a node and/or an edge of the second path to be connected to one or more nodes and/or edges of the first path. This allows for a free configuration of the ANN for an improvement and/or modification of one or more specific task(s) using a minimum of computational resources.

In a further refinement of the present invention, the ANN may have a plurality of second paths. Each second path may be set up for a task-specific information flow to only a subset of the plurality of task-specific ANN segments. In other words, the ANN may have multiple second paths that are allocated (only) to one specific task in each case so that the different second paths are decoupled from one another with regard to their respective information flows. This makes it possible to achieve the afore-described advantages for the modification and/or improvement of individual specific tasks even if the ANN is to carry out three or more tasks that differ from one another and, for example, only two of three or at least three of at least four different tasks, etc. are to be modified and/or improved.

According to a further development, the ANN may have at least one recurrent, task-spanning intermediate layer, which is set up for an information flow to the second path. A 'recurrent, task-spanning intermediate layer' may mean that it has direct feedback, where the node uses its output as renewed input; indirect feedback where the output of a node is used as input node in an upstream, task-spanning intermediate layer; or has lateral feedback where the output of a node is used as input of a node in the same task-spanning intermediate layer.

In another further development, the second path may also have at least one recurrent layer. As described above, this recurrent layer may be one of possibly multiple nodes of the second path. In this context, a recurrent layer may mean that this layer uses direct feedback where the node uses its output as renewed input; indirect feedback where the output of a node is used as input node in an upstream, task-spanning intermediate layer; or lateral feedback where the output of a node is used as input of a node in the same task-spanning intermediate layer.

A third aspect of the present invention provides a device which has at least one artificial neural network, ANN, which is capable of multitasking as described above. The ANN may be implemented in the form of software, hardware or a mixed form of software and hardware.

For example, the device may be embodied as a computer, an electronic control unit or a control unit network or similar device. In addition, the device may include at least one processor, a memory such as a volatile or non-volatile memory, one or more data interface(s) to detection devices such as sensors, actuators of an automaton, robot or some other device, a communications interface, etc. The device may also be set up to receive input data in the form of signals, for example, to supply these signals to the input layer of the afore-described ANN, and to provide its output data. The device may therefore be used in the field of automation technology, robotics or in a similar area, for example, the specific tasks being able to be modified and/or improved as described above.

A fourth aspect of the present invention provides a method for operating an artificial neural network ANN capable of multitasking. The ANN, for instance, may be implemented in the afore-described device such as a computer or an electronic control unit, etc.

In accordance with an example embodiment of the present invention, the provided method has the following steps:

In a first phase, a plurality of tasks of the ANN that differ from one another is jointly trained by the supply of first training data via a first path which allows for a first information flow through the ANN. This may particularly be realized by the afore-described method in one or more of the described embodiment variants.

In a second phase, one or more of the tasks of the trained ANN is/are able to be carried out. For example, these may be different tasks in the field of automation technology, robotics, etc.

In a third phase, at least one of the tasks of the ANN is able to be trained and/or corrected by the supply of second training data via a second path which differs from the first path and which permits a second information flow through the ANN which differs from the first information flow, independently of at least one further task of the plurality of tasks. This may particularly be accomplished by the afore-described method in one or more of the described embodiment variants.

In this way, at least a single task of the ANN is able to be modified and/or improved retroactively without unintentionally modifying other tasks.

A fourth aspect of the present invention relates to a computer program including instructions that when the computer program is executed by a computer, induce the computer to carry out one of the afore-described methods, that is to say, a method according to the first or third aspect, in one or more of the respectively described embodiment variants.

A fifth aspect of the present invention relates to a machine-readable memory medium on which a computer program according to the fourth aspect is stored.

The computer-readable memory medium may particularly but not necessarily be a non-volatile medium that is suitable especially for storing and/or distributing a computer program. The computer-readable memory medium may be a CD-ROM, a DVD-ROM, an optical memory medium, a solid state medium or something similar, which is supplied together with other hardware or as part of other hardware. In addition or as an alternative, the computer-readable memory medium may also be distributed or sold in some other form such as via a data network, e.g., the Internet or other wire-bound or wireless telecommunications systems. The computer-readable memory medium may be developed as a data packet or a plurality of data packets for this purpose.

Additional measures that improve the present invention will be illustrated in greater detail in the following text together with the description of the preferred exemplary embodiments of the present invention based on the figures.

BRIEF DESCRIPTION OF THE DRAWINGS

Below, advantageous exemplary embodiments of the present invention are described in detail with reference to the figures.

FIG. 5 show the example embodiment according to FIG. 4 as a directed acyclic graph for another illustration.

The figures are merely schematic and not drawn true to scale. Identical, identically acting or similar elements in the figures have been provided with the same reference numerals throughout.

DETAILED DESCRIPTION OF EXAMPLE EMBODIMENTS

Figure 1:
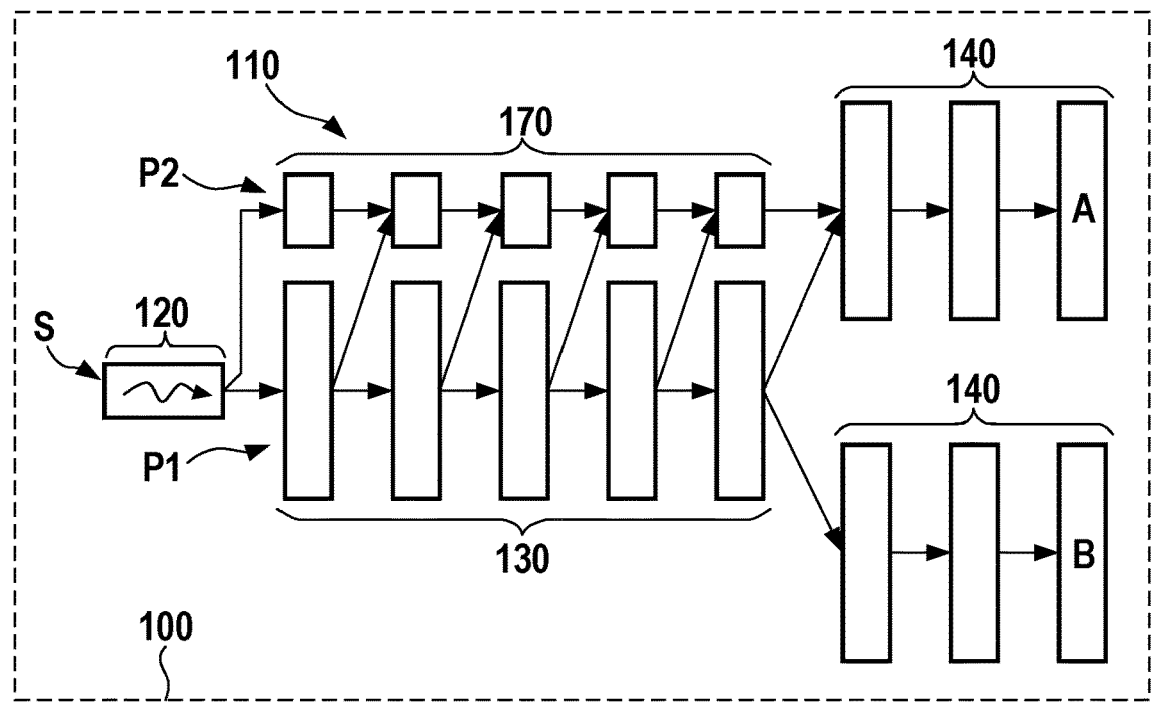
FIG. 1 shows, in a block diagram, a device having an artificial neural network according to an example embodiment of the present invention.

FIG. 1, in a block diagram, shows a device 100, which may be implemented in an at least partly automated robot (not shown) by way of example. In this case, for instance, device 100 is a computer in the form of an electronic control unit, which may be developed as an embedded system, for example, in order to execute automatization and/or control tasks of the robot, for instance. Simply by way of example, the robot could be a vehicle driving in an at least partly automated manner such as an at least partly automated motor vehicle. Device 100 is furthermore configured, at least in a live operation, to receive input signals from sensors of the robot, for example, to process the input signals and to generate output signals of its own in response to the input signals and to make them available to an actuator of the robot, for instance. In connection with the example of a vehicle, device 100 is able to control at least partial functions of the vehicle based on the incoming sensor signals through a control of an actuator and/or a vehicle drive, etc.

Device 100 includes an artificial neural network 110, which is abbreviated to ANN in the following text and illustrated here for better clarity as a directed graph having a number of nodes and edges. The nodes represent layers or a number of neurons situated in the layers. The edges represent connections between the layers or the neurons situated in the layers.

ANN 110 is able to multitask, that is to say, is designed to carry out multiple tasks in parallel with one another, e.g., at the same time, in alternation, etc. In this particular exemplary embodiment, ANN 110 is set up to execute at least two tasks that differ from one another and are distinguished in FIG. 1 and in the following text by reference signs A and B. Merely by way of example, ANN 110 may be set up for image processing such as a detection of different objects in sensor data or similar tasks. To name just one example, a traffic sign detection may be provided as task A and a semantic scene segmentation as task B. Since ANN 110 essentially involves a machine learning system, it may also be set up or provided for a multitude of other technical tasks.

As illustrated in FIG. 1, ANN 110 has a multilayer development, including an input layer 120, at least one task-spanning intermediate layer 130, and multiple task-specific ANN segments 140, i.e., corresponding in their number to the number of tasks A, B. In FIG. 1, the multiplicity of ANN segments 140 thus relates to the two tasks A and B, which means that ANN 110 has two ANN segments 140 in this case by way of example. As a matter of principle, each of ANN segments 140 may represent an output layer of ANN 110. As sketched in FIG. 1, each one of ANN segments 140 may also be developed to include multiple layers of its own with a corresponding number of hierarchically situated, task-specific task layers; here, only three task-specific task layers are shown for each task A and B by way of example, but the number may deviate to include more or fewer layers. The number of intermediate layers 130 exemplarily amounts to five in this case, but more or fewer intermediate layers 130 may also be provided.

As sketched in FIG. 1 by corresponding nodes and edges, task-spanning intermediate layers 130 are common to both tasks A and B. Thus, these are layers that share tasks A and B (shared layers). Sharable, in particular, are parameters that can be used in a task-spanning manner, e.g., weights of the individual nodes, or in other words, layers or neurons, activation functions, and others. The complexity of intermediate layers 130 may increase hierarchically, for example.

According to FIG. 1, input layer 120 is coupled via an edge with intermediate layers 130, and these in turn are coupled by way of an edge with task-specific ANN segments 140, thereby enabling an information flow from input layer 120 via intermediate layers 130 to ANN segments 140, which are allocatable to tasks A and B and function as a respective output layer in each case. An arrow in FIG. 1 indicates an input signal S, which induces the corresponding information flow. In a training phase, input signal S may represent training data, while sensor data or similar data, for instance, are fed in during a live operation of device 100.

As illustrated in FIG. 1, ANN 110 has a first path P1, which couples input layer 120 via task-spanning intermediate layers 130 with task-specific ANN segments 140 for a first information flow through ANN 110 in the direction indicated by the arrows of the edges. Accordingly, an edge of final intermediate layer 130 in the direction of the information flow couples it with the first layer of respective task-specific ANN segment 140 in the direction of the information flow. This means that the information flow of first path P1 branches from the last of intermediate layers 130 in the direction of first task A and in the direction of second task B.

As furthermore shown in FIG. 1, ANN 110 additionally has a second path P2 whose second information flow differs from the afore-described first information flow. For example, second path P2 has further nodes 170 of its own, which are connected to one another via further edges. Nodes 170 in turn may be understood as layers or as neurons arranged in layers. Second path P2 terminates only in one of the two tasks, i.e., in first task A in this particular exemplary embodiment. Thus, path P2 represents a task-specific side path, which may permit the second information flow to one of the tasks, in this case first task A, but is decoupled from the at least one other task, which is task B here. The second information flow along second path P2 therefore also affects only the task allocated to this path, i.e., first task A in this case, while the other task, here task B, is not affected.

In the exemplary embodiment according to FIG. 1, second path P2, purely by way of example, has a number of nodes that corresponds to the number of task-spanning intermediate layers 130. This number may also differ, however. The last one of nodes or layers 170 of second path P2 in the direction of the information flow is coupled with ANN segment 140 allocated to first task A. Simply as an example, the ANN segment of, for instance, task A has three task-specific task layers here, of which the first node in the direction of the information flow is coupled with the last one of the nodes or layers 170 of second path P2. It should be noted that the information flow of second path P2 in the direction of first task A may be implemented using at least one operator so that the information flow of second path P2 toward first task A may be additive, subtractive, multiplicative, concatenating, etc., for example. As illustrated in FIG. 1, individual layers 170 or all layers 170 of second path P2 are able to be combined with intermediate layer data, i.e., the afore-described parameters that are usable in a task-spanning manner, for instance, which are derived from task-spanning intermediate layers 130. In other words, there may be an information flow along an edge which couples one or more of the task-spanning intermediate layer(s) 130 with second path P2, e.g., with an edge or a node thereof. Along this edge, data that are usable in a task-spanning manner, for example, especially parameters, can then be supplied to second path P2, for instance. It should be noted that this information flow is preferably unidirectional (or in other words, exclusively from task-spanning intermediate layers 130 to second path P2) so that the information flow via second path P2 is unable to modify the parameters, data, etc., of task-spanning intermediate layers 130.

Figure 2:
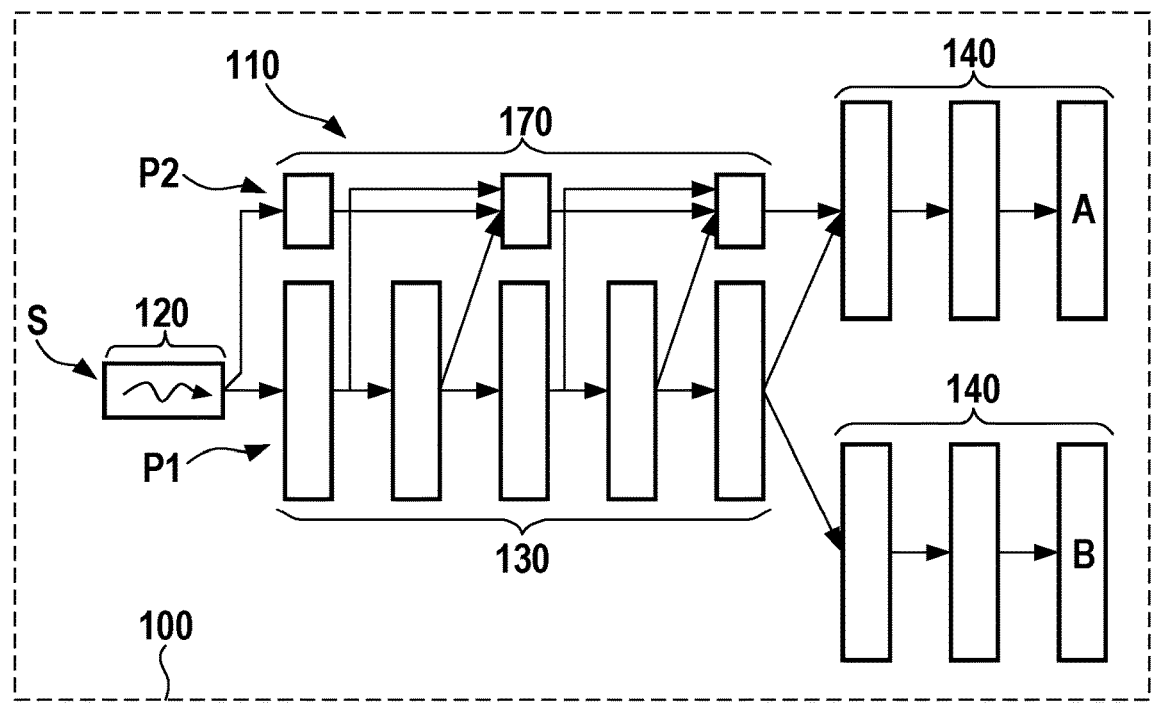
FIG. 2 shows, in a block diagram, a device having an artificial neural network according to an example embodiment of the present invention.

FIG. 2 shows, in the form of a block diagram, a further embodiment of device 100 or ANN 110. In essence, this embodiment differs from the embodiment shown in FIG. 1 in that second path P2 has a number of layers 170 that deviates from the number of task-spanning intermediate layers 130 of first path P1. Merely by way of example, the number of layers 170 of second path P2 is lower here than the number of task-spanning intermediate layers 130 of first path P1, but the reverse is also possible. Nevertheless, it is still possible to supply all parameters able to be used in a task-spanning manner to second path P2 because corresponding edges are provided from first path P1 to second path P2.

Figure 3:
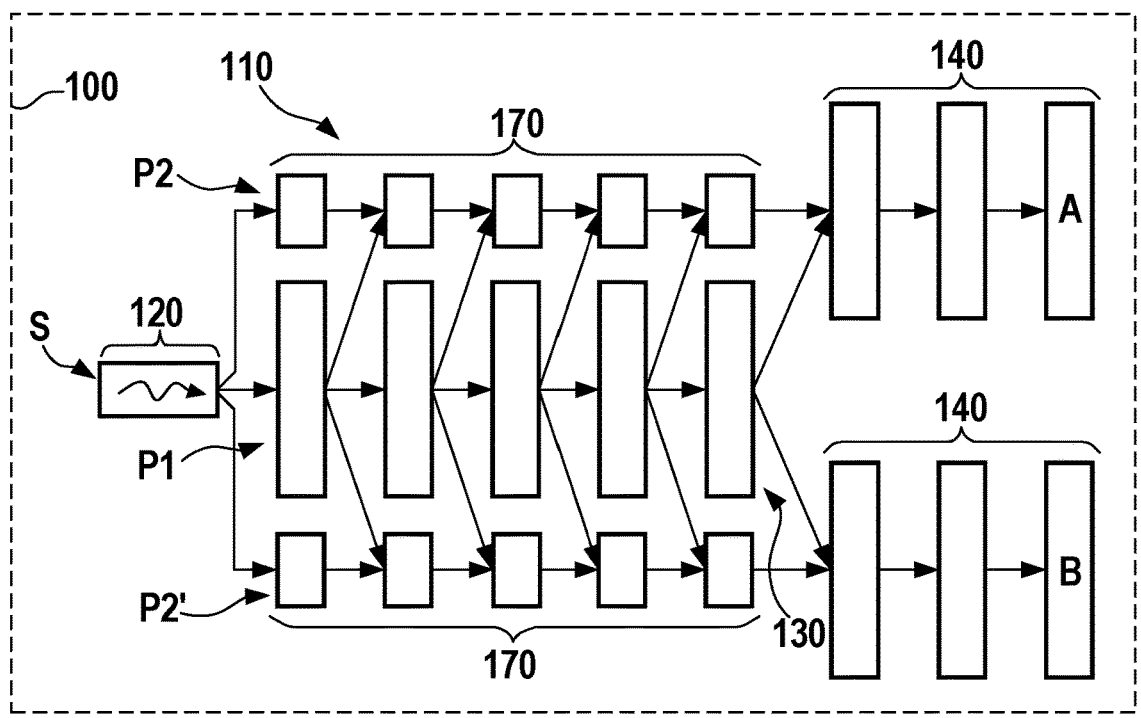
FIG. 3 shows, in a block diagram, a device having an artificial neural network according to an example embodiment of the present invention.

FIG. 3 shows in a block diagram another embodiment of device 100 or ANN 110. This embodiment essentially differs from the above-described embodiments in that a further second path P2' for a second information flow through ANN 110 is also provided for second task B. In essence, the above comments in connection with second path P2 apply also to further second path P2'. It should be noted that second path P2'—as illustrated in FIG. 3—is able to influence only second task B, but is unable to have any effect on first task A.

Figure 4:
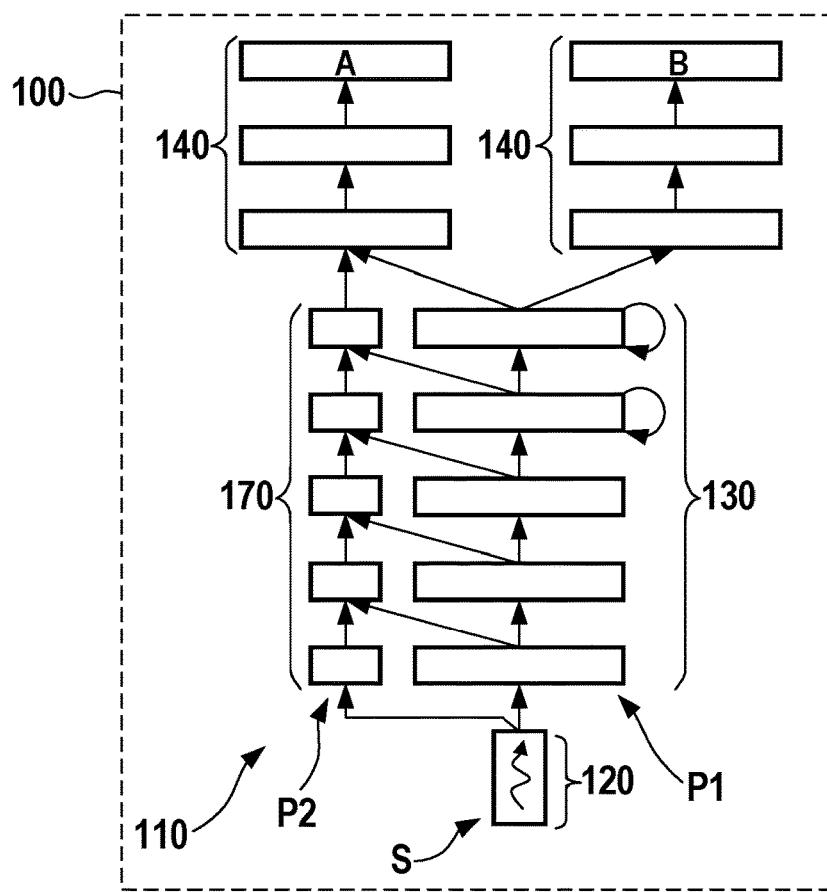
FIG. 4 shows, in a block diagram, a device having an artificial neural network according to an example embodiment of the present invention.

FIGS. 4 and 5 a further embodiment of device 100 or ANN 110 in a block diagram. According to this embodiment, a few or possibly also all of task-spanning intermediate layers 130 may be embodied as recurrent layers. Accordingly, the information flow between task-spanning intermediate layers 130 among one another and/or to second path P2 may be more complex here than in the above-described embodiments. In order to illustrate a correspondingly more complex exemplary information flow through ANN 110, ANN 110 according to this embodiment is illustrated in FIG. 5 in the form of a directed acyclic graph at different instants t for input signal S with t=0, t=1, and t=2.

Based on FIG. 1, which shows a block circuit diagram, the way in which device 100 or ANN 110 is able to be trained for executing different tasks A, B will be described in the following text by way of example.

As described earlier, ANN 110 has first path P1 for the first information flow through ANN 110. In one phase, first training data, which are configured to train the task-spanning parameters in task-spanning intermediate layers 130 shared by tasks A and B, are supplied via this first path P1; in this training, weights of the individual layers or the neurons situated therein, for instance, are adjusted in order to then be able to carry out the respective task A or B with a desired quality. In this way, the different tasks A and B are trainable also little by little. After the training, ANN 110 is then basically adapted or trained for a live operation. It should be mentioned that these training data are represented by input signal 120 here merely for the sake of clarity.

As a rule, ANN 110 is also validated prior to the live operation. However, if it turns out during the validation that a task, e.g., first task A according to FIG. 1, does not supply the desired performance, then the afore-described architecture of ANN 110 allows for retroactive training, finetuning, correction, etc., or in general terms, an adaptation of specific task A, with the aid of second path P2 for the second information flow through ANN 110. To this end, task-specific second training data which allow for an adaptation of the one task, here first task A, without any effect on the other task, which is second task B in this case, are supplied via task-specific second path P2. It should be noted that, for better clarity, these training data are represented by input signal 120 in this instance.

Since the supply of task-specific training data via second path P2 (this also applies to further second path P2') causes a change only in the parameters, settings, etc. of task A, and thus does not also change the parameters of task-spanning intermediate layers 130 or the task-specific parameters, the settings, etc. allocated to tasks B, the expenditure of the validation is subsequently considerably reduced. It is understood that if task B remains unchanged, then only task A, modified via second path P2 or P2' by the supply of second training data, needs to be validated because there has been no change in the parameters, settings, etc. common to tasks A and B.

The afore-described principle of the training, in particular the task-specific training, is able to be correspondingly transferred to all embodiments of this application.

What is claimed is:

1. A method for training an artificial neural network (ANN) capable of multitasking, the method comprising the following steps:
   providing a first path for a first information flow through the ANN, the first path coupling an input layer of the ANN with at least one task-spanning intermediate layer of the ANN, which is common to a plurality of tasks of the ANN that differ from one another, and the first path couples the at least one task-spanning intermediate layer with a respective task-specific ANN segment of each of the plurality of tasks differing from one another;
   providing first training data for training task-spanning parameters, which are common to the plurality of tasks of the ANN differing from one another, via the input layer and the first path;
   providing at least one task-specific second path for a second information flow through the ANN that differs from the first information flow, the second path (P2) coupling the input layer of the ANN with only a portion of the task-specific ANN segments of the plurality of tasks differing from one another; and
   supplying second training data for the training of task-specific parameters via the second path, wherein the at least one task-spanning intermediate layer includes a plurality of task-spanning intermediate layers, and wherein only a last one of the task-spanning intermediate layers in a direction of information flow from the input layer to the task-specific ANN segments branches directly to a task-specific ANN segment belonging to the first path and directly to a task-specific ANN segment belonging to the second path.

2. The method as recited in claim 1, wherein an information flow from the at least one task-spanning intermediate layer to the second path is permitted, but an opposite information flow from the second path to the task-spanning intermediate layer is prevented.

3. The method as recited in claim 1, wherein the second training data, conveyed via the second path, are combined from input data that are supplied to the input layer, and from intermediate layer data that are derived from the at least one task-spanning intermediate layer.

4. The method as recited in claim 1, wherein from a plurality of task-spanning intermediate layers, particular ones are selected for a linkage with the second path that aid in the training of the task-specific parameters.

5. The method as recited in claim 1, wherein a validation of at least a subset of the tasks able to be carried out by the ANN is performed between the providing of the first training data and the supply of the second training data, and the supply of the second training data, for an adaptation of at least one specific task, is carried out while excluding an adaptation of at least one further specific task that differs from the at least one specific task.

6. An artificial neural network (ANN) capable of multi-tasking, the ANN being implemented via a non-transitory machine-readable memory medium on which is stored a computer program including instructions for training an artificial neural network (ANN) capable of multitasking, the ANN comprising:
   an input layer;
   a plurality of task-specific ANN segments, which are allocated to a plurality of differing tasks of the ANN;
   at least one task-spanning intermediate layer situated between the input layer and the plurality of task-specific ANN segments and includes a number of parameters that are usable in a task-spanning manner;
   a first path which couples the input layer via the at least one task-spanning intermediate layer with the plurality of task-specific ANN segments for a first information flow through the ANN; and
   at least one task-specific second path which couples the input layer with only a subset of the plurality of task-specific ANN segments for a task-specific second information flow through the ANN that differs from the first information flow, wherein the at least one task-spanning intermediate layer includes a plurality of task-spanning intermediate layers, and wherein only a last one of the task-spanning intermediate layers in a direction of information flow from the input layer to the task-specific ANN segments branches directly to a task-specific ANN segment belonging to the first path and directly to a task-specific ANN segment belonging to the second path.

7. The ANN capable of multi-tasking as recited in claim 6, wherein a number of layers of the second path differs from a number of the at least one task-spanning intermediate layer.

8. The ANN capable of multi-tasking as recited in claim 6, wherein the ANN has a plurality of second paths, and each of the second paths is set up for a task-specific information flow to only a subset of the plurality of task-specific ANN segments.

9. The ANN capable of multi-tasking as recited in claim 6, wherein the ANN includes at least one recurrent, task-spanning intermediate layer which is set up for an information flow to the second path.

10. A device, comprising:
   a processor; and
   a memory that stores instructions that when executed by the processor implement at least one artificial neural network (ANN) which is capable of multi-tasking, the ANN comprising:
   an input layer;
   a plurality of task-specific ANN segments, which are allocated to a plurality of differing tasks of the ANN;
   at least one task-spanning intermediate layer situated between the input layer and the plurality of task-specific ANN segments and includes a number of parameters that are usable in a task-spanning manner;
   a first path which couples the input layer via the at least one task-spanning intermediate layer with the plurality of task-specific ANN segments for a first information flow through the ANN; and
   at least one task-specific second path which couples the input layer with only a subset of the plurality of task-specific ANN segments for a task-specific second information flow through the ANN that differs from the first information flow, wherein the at least one task-spanning intermediate layer includes a plurality of task-spanning intermediate layers, and wherein only a last one of the task-spanning intermediate layers in a direction of information flow from the input layer to the task-specific ANN segments branches directly to a task-specific ANN segment belonging to the first path and directly to a task-specific ANN segment belonging to the second path.

11. A method for operating an artificial neural network (ANN) capable of multi-tasking, the method comprising the following steps:
   in a first phase, jointly training a plurality of tasks of the ANN that differ from one another by supplying first training data via a first path which allows for a first information flow through the ANN;
   in a second phase, training one or more of the plurality of tasks of the trained ANN; and
   in a third phase, adapting at least one of the plurality of tasks of the ANN by supplying second training data via a second path, which differs from the first path, which permits a second information flow through the ANN which differs from the first information flow, independently of at least a further task of the plurality of tasks, wherein at least one task-spanning intermediate layer includes a plurality of task-spanning intermediate layers, and wherein only a last one of the task-spanning intermediate layers in a direction of information flow from an input layer to task-specific ANN segments branches directly to a task-specific ANN segment belonging to the first path and directly to a task-specific ANN segment belonging to the second path.

12. A non-transitory machine-readable memory medium on which is stored a computer program including instructions for training an artificial neural network (ANN) capable of multitasking, the instructions, when executed by a computer, causing the computer to perform the following steps:
   providing a first path for a first information flow through the ANN, the first path coupling an input layer of the ANN with at least one task-spanning intermediate layer of the ANN, which is common to a plurality of tasks of the ANN that differ from one another, and the first path couples the at least one task-spanning intermediate layer with a respective task-specific ANN segment of each of the plurality of tasks differing from one another;

providing first training data for training task-spanning parameters, which are common to the plurality of tasks of the ANN differing from one another, via the input layer and the first path;

providing at least one task-specific second path for a second information flow through the ANN that differs from the first information flow, the second path (P2) coupling the input layer of the ANN with only a portion of the task-specific ANN segments of the plurality of tasks differing from one another; and supplying second training data for the training of task-specific parameters via the second path, wherein the at least one task-spanning intermediate layer includes a plurality of task-spanning intermediate layers, and wherein only a last one of the task-spanning intermediate layers in a direction of information flow from the input layer to the task-specific ANN segments branches directly to a task-specific ANN segment belonging to the first path and directly to a task-specific ANN segment belonging to the second path.

13. A non-transitory machine-readable memory medium on which is stored a computer program including instructions for operating an artificial neural network (ANN) capable of multi-tasking, the instruction, when executed by a computer, causing the computer to perform the following steps:

in a first phase, jointly training a plurality of tasks of the ANN that differ from one another by supplying first training data via a first path which allows for a first information flow through the ANN;

in a second phase, training one of more of the plurality of tasks of the trained ANN; and in a third phase, adapting at least one of the plurality of tasks of the ANN by supplying second training data via a second path, which differs from the first path, which permits a second information flow through the ANN which differs from the first information flow, independently of at least a further task of the plurality of tasks, wherein at least one task-spanning intermediate layer includes a plurality of task-spanning intermediate layers, and wherein only a last one of the task-spanning intermediate layers in a direction of information flow from an input layer to task-specific ANN segments branches directly to a task-specific ANN segment belonging to the first path and directly to a task-specific ANN segment belonging to the second path.

* * * * *